United States Patent
Friebe et al.

(10) Patent No.: US 10,825,147 B2
(45) Date of Patent: Nov. 3, 2020

(54) SURROUND VIEW SYSTEM FOR A VEHICLE

(71) Applicant: Conti Temic microelectronic GmbH, Nuremberg (DE)

(72) Inventors: Markus Friebe, Gefrees (DE); Martin Buerker, Ulm (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 16/470,381

(22) PCT Filed: Mar. 5, 2018

(86) PCT No.: PCT/DE2018/200021
§ 371 (c)(1),
(2) Date: Jun. 17, 2019

(87) PCT Pub. No.: WO2018/188700
PCT Pub. Date: Oct. 18, 2018

(65) Prior Publication Data
US 2020/0090307 A1 Mar. 19, 2020

(30) Foreign Application Priority Data
Apr. 11, 2017 (DE) .......................... 10 2017 206 175

(51) Int. Cl.
*G06T 5/00* (2006.01)
*G06T 7/70* (2017.01)
(Continued)

(52) U.S. Cl.
CPC ................ *G06T 5/002* (2013.01); *B60R 1/00* (2013.01); *G06T 7/70* (2017.01); *H04N 7/181* (2013.01);
(Continued)

(58) Field of Classification Search
CPC . G06T 5/002; G06T 7/70; G06T 2207/30252; H04N 7/181; B60R 1/00;
(Continued)

(56) References Cited

U.S. PATENT DOCUMENTS

| | | |
|---|---|---|
| 10,291,846 B2 | 5/2019 | Liepelt et al. |
| 2014/0347470 A1 | 11/2014 | Zhang et al. |

(Continued)

FOREIGN PATENT DOCUMENTS

| | | | |
|---|---|---|---|
| DE | 102013217081 | 3/2015 | |
| DE | 102013217081 A1 * | 3/2015 | ............... B60R 1/00 |
| DE | 102015208343 | 11/2016 | |

OTHER PUBLICATIONS

English translation of the International Search Report of the International Searching Authority for International Application PCT/DE2018/200021, mailed Jun. 14, 2018, 2 pages, European Patent Office, HV Rijswijk, Netherlands.

(Continued)

*Primary Examiner* — Tat C Chio
(74) *Attorney, Agent, or Firm* — W. F. Fasse

(57) ABSTRACT

A surround view system for a vehicle includes a processor (10) and cameras (2 to 5) that can be arranged on the vehicle so that the cameras (2 to 5) can record images of an outside environment of the vehicle. The processor is configured to analyze a position (α) and/or a movement of a movable part (14) of the vehicle (1) and to generate a composite image of the outside environment from individual images recorded by the cameras. Furthermore, the processor is configured to calculate an image processing region within the composite image for an adaptive image processing, to determine, based on the analyzed position and/or movement of the movable part (14), that a back-projection of the movable part (14) goes beyond the image processing region, and to modify the (Continued)

image processing region so that the back-projection of the movable part (14) is within the modified image processing region.

18 Claims, 2 Drawing Sheets

(51) Int. Cl.
    *B60R 1/00*     (2006.01)
    *H04N 7/18*     (2006.01)
    *B62D 15/02*     (2006.01)

(52) U.S. Cl.
    CPC ... *B60R 2300/102* (2013.01); *B60R 2300/105* (2013.01); *B60R 2300/303* (2013.01); *B60R 2300/307* (2013.01); *B62D 15/024* (2013.01); *G06T 2207/30252* (2013.01)

(58) Field of Classification Search
    CPC ........ B60R 2300/303; B60R 2300/307; B60R 2300/105; B60R 2300/102; B62D 15/024
    See application file for complete search history.

(56) References Cited

U.S. PATENT DOCUMENTS

| 2015/0178884 A1* | 6/2015 | Scholl | G06T 3/0018 |
| | | | 348/36 |
| 2018/0115707 A1* | 4/2018 | Liepelt | G06T 3/4038 |

OTHER PUBLICATIONS

PCT International Preliminary Report on Patentability including English Translation of PCT Written Opinion of the International Searching Authority for International Application PCT/DE2018/200021, issued Oct. 15, 2019, 5 pAGES, International Bureau of WIPO, Geneva, Switzerland.

German Search Report for German Patent Application No. 10 2017 206 175.8, dated Aug. 21, 2017, 8 pages, German Patent and Trademark Office, Muenchen, Germany, with partial English translation, 7 pages.

* cited by examiner

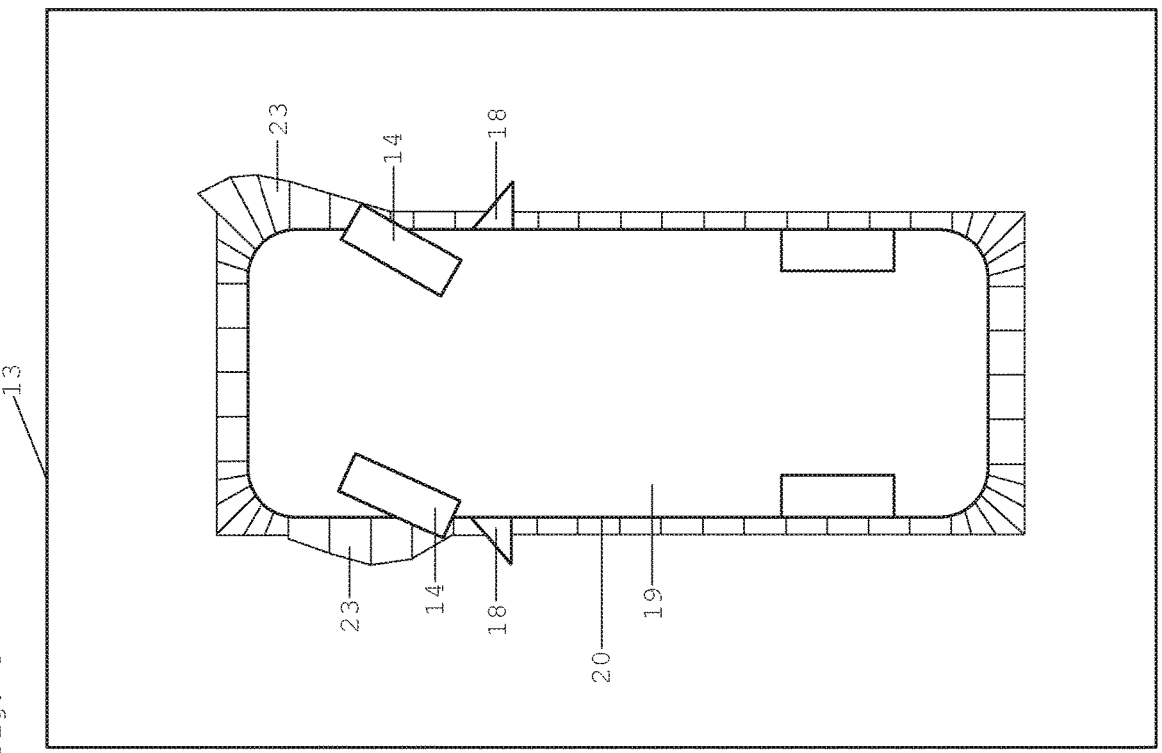
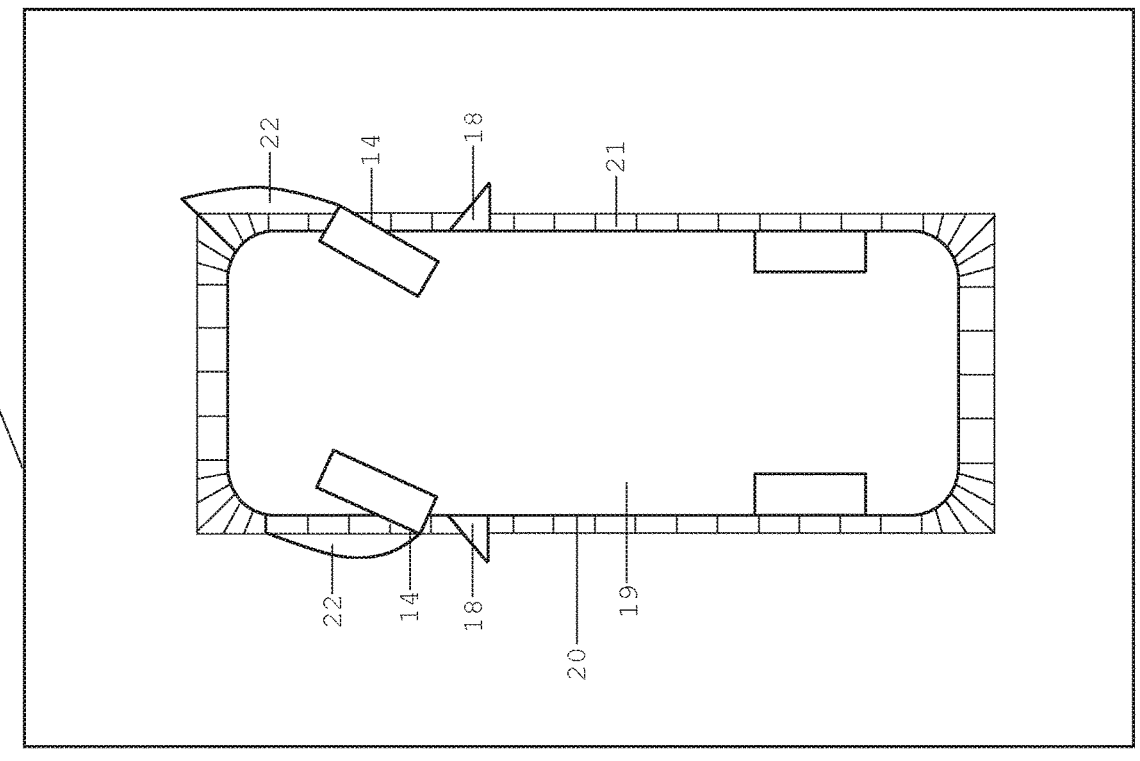

SURROUND VIEW SYSTEM FOR A VEHICLE

FIELD OF THE INVENTION

The invention relates to a surround view system for a vehicle. Furthermore, the invention relates to a method for removing an unwanted back-projection from an image of a surround view system of a vehicle, wherein the unwanted back-projection is produced by a movable part of the vehicle.

BACKGROUND INFORMATION

The known image processing functions of surround view systems do not, in particular, include information regarding the steering of the vehicle. In those cases where the vehicle is steered to the left or to the right, the wheels of the relevant vehicle can in particular become visible in images from fish-eye cameras and can be back-projected in two-dimensional or three-dimensional images of the surround view system. In a similar way, back-projected artifacts of other movable parts of the vehicle, e.g. of a rear door or a fuel tank cap, can also be visible in images of the surround view system.

SUMMARY OF THE INVENTION

It is an object of the present invention to provide a surround view system and a method of the type indicated at the outset, which allow the artifacts indicated above to no longer be visible in an image of the surround view system.

The above object can be achieved by the subject matter of the independent claims. Advantageous embodiments form the subject matter of the dependent claims, of the following description as well as of the drawing figures.

According to a first aspect of the invention, a surround view system for a vehicle is provided. The surround view system comprises a plurality of cameras (e.g. including one or more fish-eye cameras) that can be arranged on the vehicle in such a way that the plurality of cameras can record images of an outside environment of the vehicle.

Furthermore, the surround view system comprises a processor. The processor can in particular be communicatively connected to the plurality of cameras such that the processor can in particular access image data from the plurality of cameras.

The processor is designed to analyze a position and/or a movement of a movable part of the vehicle. When observed from a bird's eye view, the vehicle has an outer border or an external contour. The term "movable parts" in connection with the present invention can in particular denote those parts which produce an increase in this external contour, if the parts are moving in a specific direction. Furthermore, the processor can be designed to analyze a position and/or a movement of a plurality of movable parts of the vehicle, in particular simultaneously. The functionalities and corresponding method steps described below can accordingly be fulfilled or executed for a plurality of movable parts of the vehicle.

Furthermore, the processor is designed to generate a composite image of the outside environment of the vehicle from images of the outside environment of the vehicle, recorded by the plurality of cameras. The composite image can in particular show the outer environment of the vehicle from a bird's eye view, wherein an artificial imaging of the vehicle is inserted into the composite image at a position representing the real position of the vehicle.

The processor is further designed to calculate an image processing region within the composite image for adaptive image processing. Inasmuch as the composite image of the surround view system shows the environment of the vehicle from a bird's eye view and the artificial imaging of the vehicle, the image processing region can extend around the external contour of the vehicle. It is necessary for the image processing region to be as small as possible.

Moreover, the processor is designed to determine, based on the analyzed position and/or movement of the movable part, that a back-projection of the movable part goes beyond the image processing region. The back-projection of the movable part can in particular be produced in that the movable part does not protrude at all or protrudes less from the (actual) external contour of the vehicle in a retracted first position than in an extended second position. A depiction of the back-projection of the movable part in the composite image of the surround view system can be troublesome for an observer of the image and can therefore be unwanted.

Therefore, the processor is further designed to modify, in particular to locally increase, the image processing region in such a way that the back-projection of the movable part is within the modified image processing region. By modifying the image processing region as a function of the analyzed position and/or movement of the movable part, the image processing region can, on the one hand, in particular be selected to be sufficiently large locally such that the back-projection of the movable part is located within the modified image processing region. Within the modified image processing region, the back-projection of the movable part can be removed or modified by applying adaptive image processing methods in such a way that it does not have a troublesome effect for an observer of the composite image. Furthermore, the image processing region is not selected to be unnecessarily large, globally, since it can be precisely predicted how much the image processing region has to be increased locally (that is to say in that location where the back-projection of the movable part increases the external contour of the vehicle due to its movement).

The processor can preferably be designed to remove the back-projection of the movable part from the composite image or to modify said back-projection within the modified image processing region by applying image processing methods within the modified image processing region. By modifying the image processing region and subsequently removing or modifying the back-projection of the movable part, it is made possible for the back-projection of the movable part to no longer be visible in the image of the surround view system or to at least no longer be troublesome therein.

According to an embodiment, the image processing comprises a spatial prediction of color information. For example, the image processing region can be colorized like an environmental region which encloses the image processing region in the image of the surround view system. In order to determine the color of the environmental surface, a low-pass filter can be used for example.

Alternatively or additionally, the image processing can comprise a so-called "motion-compensated-texture" method. In connection with this, a texture recognized in a first image of the surround view system can in particular be used for a following second image of the surround view system, wherein the recognized texture can be used in the following second image at an appropriate position within the image processing region, taking account of the ego movement of the vehicle.

According to a further embodiment, the control unit is designed to analyze the position and/or the movement of the movable part based on information which is provided by a bus system of the vehicle. In particular, it is possible with this embodiment to dispense with the separate collection of the information or data required to analyze the position and/or the movement of the movable part. Instead, data can be accessed which is in particular generated anyway, and which can be accessed via the data bus.

Furthermore, the movable part can be a wheel of the vehicle, wherein the processor can be designed to measure a steer angle of the wheel (e.g. with the assistance of an appropriate sensor) or to determine said steer angle. In particular, the steer angle of the wheel can be provided by the bus system of the vehicle, and the processor can access these provided steer angles.

Furthermore, the movable part can be a door, a tailgate, a hood, a pivotable side mirror or a fuel tank cap of the vehicle.

According to a second aspect of the invention, a vehicle is provided, which comprises a surround view system according to the first aspect of the invention. The vehicle is, for example, a motor vehicle such as a car, a bus or a truck.

According to a third aspect of the invention, a method for removing an unwanted back-projection from an image of a surround view system of a vehicle is provided. The method comprises the following steps of:

recording a plurality of images of an outside environment of the vehicle by means of a plurality of cameras of a surround view system of the vehicle, analyzing a position and/or a movement of a movable part of the vehicle, generating a composite image of the outside environment of the vehicle from the plurality of recorded images of the outside environment of the vehicle, calculating an image processing region within the composite image for an adaptive image processing, determining, based on the analyzed position and/or movement of the movable part, that a back-projection of the movable part goes beyond the image processing region, modifying the image processing region in such a way that the back-projection of the movable part is within the modified image processing region, and preferably removing the back-projection of the movable part from the composite image or modifying the back-projection of the movable part within the modified image processing region by applying image processing methods within the modified image processing region.

With regard to the effects, advantages and embodiments of the method according to the third aspect of the invention, reference is made to the above embodiments in connection with the surround view system according to the first aspect of the invention in order to avoid repetitions. The functional features described in connection with the embodiments of the surround view system according to the first aspect of the invention can in particular be implemented as appropriate method features for appropriate embodiments of the method according to the third aspect of the invention.

According to a fourth aspect of the invention, a program element is provided, which, if it is run on a processor, instructs the processor to perform the method steps of the method according to the third aspect of the invention.

According to a fifth aspect of the invention, a computer-readable medium is provided, on which a program element is stored, which, if it is run on a processor, instructs the processor to perform the method steps of the method according to the third aspect of the invention.

BRIEF DESCRIPTION OF THE DRAWINGS

Exemplary embodiments of the invention are explained in greater detail below, with reference to the schematic drawing which is not to scale, wherein FIG. 3 shows an image of the surround view system in accordance with FIG. 2, and FIG. 4 shows the image in accordance with FIG. 3, wherein an image processing region has been modified by a processor of the surround view system.

DETAILED DESCRIPTION OF EXAMPLE EMBODIMENTS OF THE INVENTION

Figure 1:
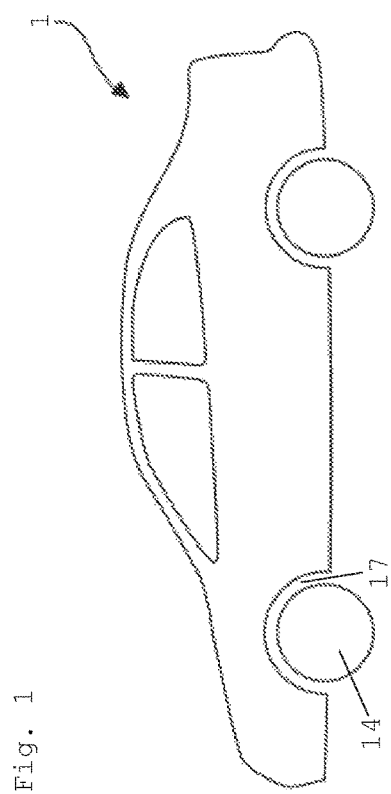
FIG. 1 shows a side view of a motor vehicle.
Figure 2:
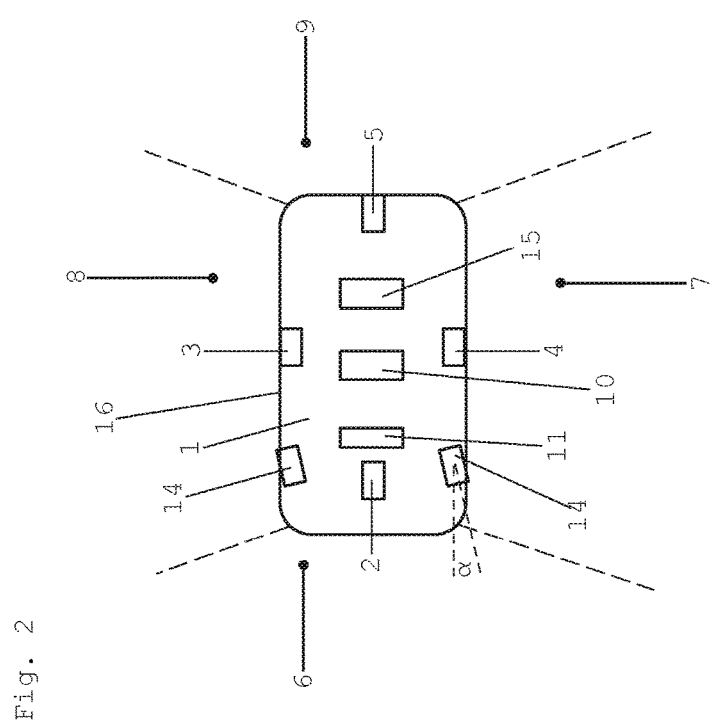
FIG. 2 shows a considerably schematized top view of the motor vehicle in accordance with FIG. 1, wherein a surround view system of the motor vehicle is depicted.

FIGS. 1 and 2 show a vehicle in the form of a motor vehicle 1. The motor vehicle 1 has four cameras 2 to 5 which are depicted in FIG. 2. FIG. 2 shows how the four cameras 2 to 5 of the vehicle 1 can be arranged. Furthermore, possible fields of view 6 to 9 of the cameras 2 to 5 are shown. The vehicle 1 comprises a first camera 2, a second camera 3, a third camera 4 and a fourth camera 5. Furthermore, a processor 10 and a visual output unit in the form of a monitor 11 are arranged within the vehicle 1, wherein the monitor 11 is located in the field of view of a driver of the vehicle 1. The processor 10 can be communicatively connected to the four cameras 2 to 5 and can in particular receive image data from the four cameras 2 to 5 or access the image data.

In the exemplary embodiment shown by FIG. 2, the first camera 2 is arranged in a front region of the vehicle 1 (e.g. in the interior in the region behind a windshield of the vehicle 1) and detects a substantially front field of view 6 in an outside environment of the vehicle 1. The second camera 3 and the third camera 4 are each arranged laterally on the vehicle 1 and each respectively detect a substantially lateral field of view 8 or 7 respectively in the outside environment of the vehicle 1. The fourth camera 5 is arranged in a rear region of the vehicle 1 and detects a substantially rear field of view 9 in the outside environment of the vehicle 1. The four fields of view 6 to 9 of the four cameras 2 to 5 can jointly cover the entire perimeter (360°) of the vehicle 1.

The four cameras 2 to 5 of the vehicle 1 can, at the same time, acquire images in their respective fields of view 6 to 9, wherein appropriate image data can in particular be combined by means of the processor 10 into a two-dimensional or three-dimensional vehicle all-round composite image 12, 13 (cf. FIGS. 3 and 4) and can be displayed on the monitor 11.

Furthermore, the vehicle 1 has two adjustable front wheels 14, which can be adjusted in the known way to the left or to the right such that the vehicle 1 can be steered to the left or to the right. A corresponding steering angle α can be detected in the known way. In particular, the detected steering angle can be called up from a data bus 15 of the vehicle 1. In particular, the control unit 10 can call up the steering angle from the data bus 15. In this way, a position α and/or a movement of a movable part 14 of the vehicle 1 can be analyzed by means of the processor 10.

The front wheels 14 each constitute a movable part of the vehicle 1. These movable parts make it possible, by their adjustment—by an adjustment of the steering angle α of the front wheels 14 in the exemplary embodiment shown—for an external contour 16 of the vehicle 1 observed from a bird's eye view to be increased. Based on the exemplary embodiment shown by FIG. 2, this is achieved in that, at the steering angle α shown, the front wheels 14 project somewhat laterally from wheel wells 17 of the vehicle 1. A similar effect can be created for example by a door, a tailgate, a hood, a pivotable side mirror 18 (see FIGS. 3 and 4) or a fuel tank cap of the vehicle 1.

FIGS. 3 and 4 each show an image 12, 13 of the surround view system, wherein the image 12, 13 is in each case composed of individual images of the cameras 2 to 5, recorded at the same time. The image 13 in accordance with FIG. 4 is based on the image 12 in accordance with FIG. 3. The images 12, 13 are composed and processed in such a way that the outer environment in the fields of view 6 to 9 of the vehicle 1 is visible from a bird's eye view. An artificially produced image 19 of the vehicle 1 is inserted into each of the images 12, 13. The image 19 of the vehicle 1 has an external contour 20 which corresponds to the actual external contour 16 of the vehicle 1. Furthermore, the image 19 of the vehicle 1 is arranged at a position within the image 12, 13 which corresponds to the actual position of the vehicle 1. The artificially produced image 19 of the vehicle 1 can in particular be inserted by the processor 10.

An image processing region 21 is in particular calculated within the composite image 12 by means of the processor 10 for an adaptive image processing. The image processing region 21 is depicted by grid lines in FIG. 3, wherein the image processing region 21 laterally encloses the image 19 of the vehicle 1. Within the image processing region 21, the composite image 12 can be modified by applying adaptive image processing methods. For example, methods which are known per se such as "spatial prediction of color information" or "motion compensated texture" can be used.

Based on the analyzed position α of the front wheels 14, it can in particular be determined by means of the processor 10 that a back-projection 22 (the border of which is depicted in FIG. 3 with a thicker line than the image processing region 21, for the sake of clarity) goes beyond the image processing region 21 within the composite image 12. In order to counter this, the image processing region 21 can in particular be modified by means of the processor 10 in such a way that the back-projection 22 of the front wheels 14 is within the now modified image processing region 23, as shown by FIG. 4. To this end, the image processing region 21 is increased locally in the region of the back-projection of the front wheels 14 in such a way that the back-projection 22 of the front wheels 14 is within the locally increased image processing region 23. In other regions, in which there is no increase in the external contour 20, the image processing region 21 can be left at its originally calculated size.

Within the modified image processing region 23, the back-projection 22 of the front wheels 14 can be modified by applying adaptive image processing methods in such a way that it no longer has a troublesome effect for an observer of the composite image 13. The back-projection 22 of the front wheels 14 can also be removed from the image 13.

The invention claimed is:

1. A surround view system for a vehicle,
said surround view system comprising:
a plurality of cameras that can be arranged on the vehicle so that the cameras can record images of an outside environment of the vehicle, and
a processor,
wherein the processor is configured:
to analyze a position and/or a movement of at least one movable part of the vehicle,
to generate a composite image of the outside environment from the images recorded by the cameras,
to determine an initial image processing region within the composite image,
to determine, based on the analyzed position and/or movement of the movable part, that a back-projection of the movable part in the composite image extends beyond and outside of the initial image processing region,
to modify the initial image processing region into a modified image processing region so that the back-projection of the movable part in the composite image is within the modified image processing region, and
to perform an adaptive image processing of the composite image within the modified image processing region.

2. The surround view system according to claim 1, wherein the processor is configured to perform the adaptive image processing so as to remove the back-projection of the movable part from the composite image.

3. The surround view system according to claim 1, wherein the adaptive image processing comprises determining a color of an environmental surface outside adjacent to the modified image processing region, and applying the determined color to the modified image processing region in the composite image.

4. The surround view system according to claim 1, wherein the adaptive image processing comprises a motion-compensated-texture method in which a texture recognized outside of the modified image processing region in a first image is copied to a position within the modified image processing region in a second image acquired after the first image, wherein the position is determined by motion-compensation based on a motion of the vehicle between acquiring the first image and acquiring the second image.

5. The surround view system according to claim 1, wherein the processor is configured to analyze the position and/or the movement of the movable part based on information provided by a bus system of the vehicle.

6. The surround view system according to claim 1, wherein the movable part is a wheel of the vehicle, and wherein the processor is configured to measure or determine a steering angle of the wheel.

7. The surround view system according to claim 1, wherein the movable part is a door, a tailgate, a hood, a pivotable side mirror or a fuel tank cap of the vehicle.

8. The surround view system according to claim 1, wherein the processor is configured to perform the adaptive image processing so as to modify the back-projection of the movable part in the composite image.

9. The surround view system according to claim 1, wherein the processor is configured to analyze the movement of the movable part.

10. The surround view system according to claim 1, wherein the initial image processing region is an annular area that extends entirely and continuously around and is outwardly larger than an external contour of the vehicle at a front, a rear and two sides of the vehicle, wherein the external contour omits the at least one movable part.

11. The surround view system according to claim 10, wherein the initial image processing region has a rectangular outer contour.

12. The surround view system according to claim 1, wherein the modified image processing region includes all of the initial image processing region plus a respective enlarged local protrusion to encompass the respective back-projection of each respective one of the at least one movable part.

13. The surround view system according to claim 12, wherein the adaptive image processing is performed on all of the modified image processing region including the initial image processing region and each said respective enlarged local protrusion, and the adaptive image processing comprises applying a synthesized ground surface color and/or ground surface texture to the modified image processing region so as to blend the modified image processing region into a ground surface of a surrounding environmental region of the composite image.

14. The surround view system according to claim 12, wherein each said respective enlarged local protrusion has an outer contour that matches, at least in a linearized piecemeal manner, an outer contour of the respective back-projection of a corresponding respective one of the at least one movable part.

15. A vehicle, comprising a vehicle body and a surround view system according to claim 1.

16. A method of removing an unwanted back-projection from an image of a surround view system of a vehicle, the method comprising steps:
recording a plurality of recorded images of an outside environment of the vehicle by a plurality of cameras of a surround view system of the vehicle,
analyzing a position and/or a movement of at least one movable part of the vehicle,
generating a composite image of the outside environment from the plurality of recorded images,
determining an initial image processing region within the composite image,
determining, based on the analyzed position and/or movement of the movable part, that a back-projection of the movable part in the composite image extends beyond and outside of the initial image processing region,
modifying the initial image processing region into a modified image processing region so that the back-projection of the movable part in the composite image is within the modified image processing region, and
performing an adaptive image processing of the composite image within the modified image processing region.

17. A non-transitory computer-readable medium, on which is stored a computer program which when executed on a computer processor causes the method according to claim 16 to be performed.

18. A program element which is encoded in a non-transitory computer-readable medium, and which, when executed on a processor, is configured to instruct the processor to perform the method according to claim 16.

* * * * *